UNITED STATES PATENT OFFICE.

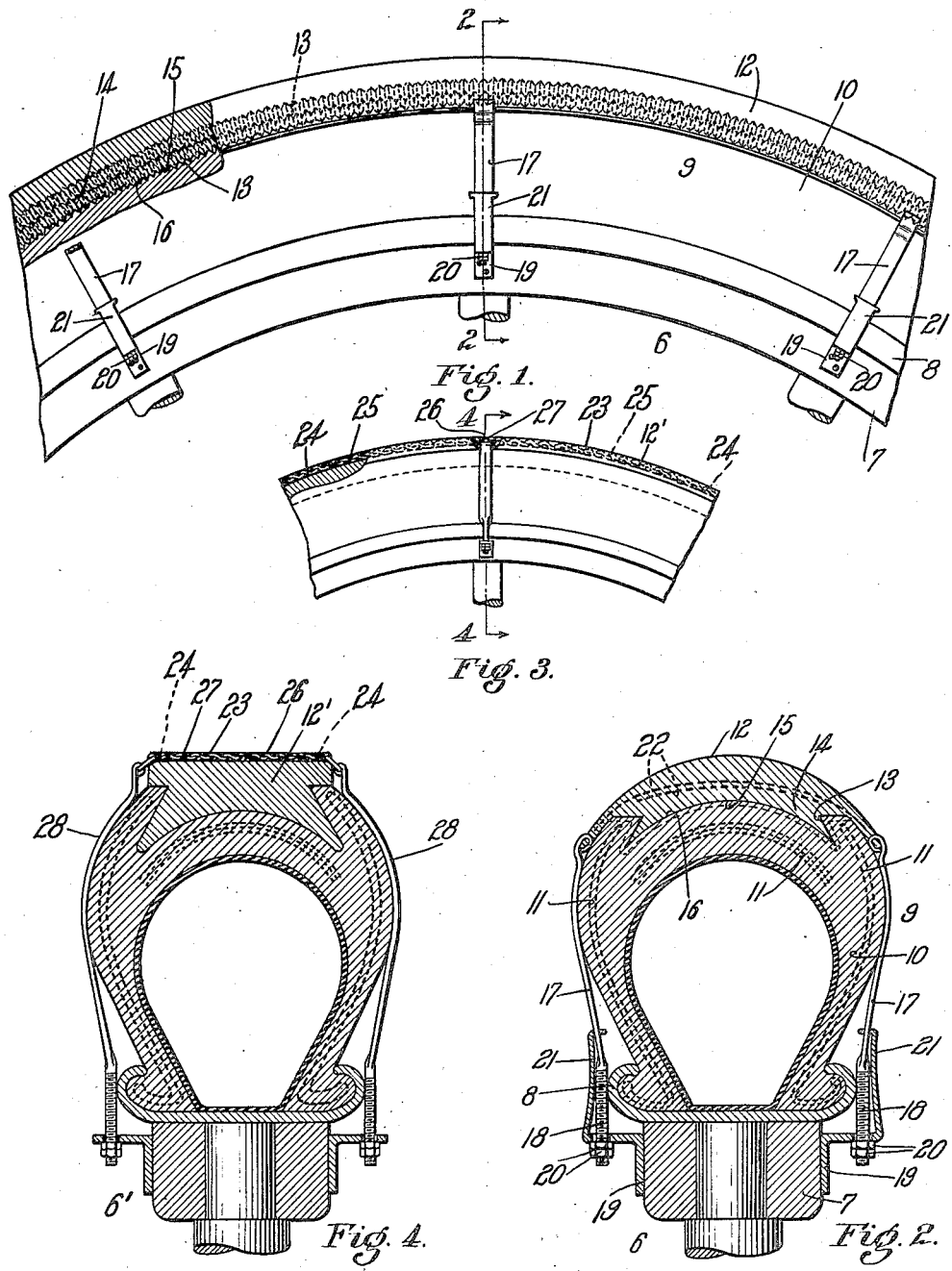

PETER BERNSTEIN, OF ROXBURY, MASSACHUSETTS.

TIRE.

1,163,311.	Specification of Letters Patent.	Patented Dec. 7, 1915.

Application filed September 30, 1914. Serial No. 864,356.

*To all whom it may concern:*

Be it known that I, PETER BERNSTEIN, a citizen of the United States, residing at Roxbury, in the county of Suffolk and State of Massachusetts, have invented new and useful Improvements in Tires, of which the following is a specification.

This invention relates to improvements in tires and more particularly to tires adapted for use on motor vehicles. In tires employed in this connection the tread portion is constructed of resilient material, such as rubber, inside of which, embedded in the rubber or resilient material constituting the shoe or body portion of the tire, are a plurality of layers of fabric which serve as a reinforcement for the rubber. As a general thing a tire constructed in this manner may be used with safety until the tread portion has been worn away and the fabric begins to appear, but after this occurs no reliance can be placed on the tire and therefore tires in this condition are usually discarded, although the same appear to be in perfect condition aside from the tread. The part discarded however represents practically the entire value of the tire as the tread portion is nothing but rubber and may be made for a very small fraction of the cost of the shoe portion of a tire.

The object of this invention is to provide a tire constructed of resilient material having a detachable tread portion, also of resilient material, which may be removed when the same has been worn out and a new one inserted in its place, permitting the shoe portion of said tire to be used over and over again.

Another object of the invention is to provide simple and efficient means whereby the detachable tread may be secured to the tire shoe.

The invention consists in the combination and arrangement of parts set forth in the following specification and particularly pointed out in the claims.

Referring to the drawings: Figure 1 illustrates a segment of the body of a wheel with a tire embodying my invention shown in connection therewith, parts of said tire being broken away and other parts shown in section. Fig. 2 is a transverse section, partly in elevation, taken on line 2—2 of Fig. 1. Fig. 3 illustrates a segment of a tire embodying a modified form of my invention. Fig. 4 is a transverse section taken on the line 4—4 of Fig. 3.

Like numerals refer to like parts throughout the several views of the drawings.

In the drawings, 6 is the body of a wheel consisting of a felly 7 and wheel rim 8 within which a tire 9 is mounted. The tire may be constructed in accordance with any of the well known types of tires suitable for use on motor vehicles, but preferably in the form of a pneumatic tire which consists of a shoe 10 formed of resilient material, preferably rubber, and reinforced in the usual manner by a plurality of layers of fabric 11 embedded in the material constituting said shoe. A tread portion 12 is detachably secured to the shoe 10 permitting said tread to be removed when worn out and replaced by a new one, whereby the shoe portion of said tire may be utilized over and over again until completely worn out.

As a preferred method of attaching the tread 12 to the shoe 10, a circumferential recess 13 is provided in the outer periphery of said shoe into which the tread is adapted to fit, that is, an internal rib 14 arranged circumferentially of said tread is adapted to fit said recess 13. The recess 13 is substantially a dovetail groove, that is to say, the mouth or opening of said recess is narrower than the bottom thereof, while the rib 14 on said tread is made similar in shape so that it will exactly fit said recess, said rib being placed within said recess when the tire is deflated. The inflation thereof causes the sides of said rib to be firmly gripped between the adjacent walls of the groove or recess.

To prevent the tread 12 from moving circumferentially relatively to the shoe the inner faces thereof are provided with corrugations 15 which are adapted to engage corrugations 16 formed upon the abutting faces of said shoe which coöperate with each other to lock said members together when the tire is inflated. To further assist in securing the tread portion 12 to the shoe portion of the tire I have provided a series of hooks 17 arranged about the opposite sides of said shoe and hooking into the edges of the tread 12, said hooks being preferably formed of sheet metal and terminating at their inner ends in screw-threaded portions 18 slidably arranged in brackets 19 secured preferably to the felly portion 7 of the wheel body. Check-nuts 20 are secured to the ends of said screw-threaded portions and engage said brackets to limit the outward movements of said hooks, said hooks being slidably arranged in said brackets to permit them to recede when the weight of the vehicle on said tire is compressing the portion thereof adjacent said hooks. Springs 21 are also provided which engage the outer faces of said hooks 17 and normally press said hooks against the sides of the tread 10, preventing them from being forced outwardly to any great extent when the tire is flattened by the weight or pressure of the vehicle thereon.

The tread 12 in the form illustrated in Fig. 2 is preferably reinforced by fabric 22 which extends from one edge to the other to assist in sustaining the strain applied to said tread by the hooks 17.

In Figs. 3 and 4 of the drawings I have illustrated a different form of tread 12′ in which form the outer periphery 23 thereof is made substantially cylindrical in shape and in which circumferential grooves 24 are formed, adjacent the opposite edges thereof, into which chains 25 are laid, while extending transversely of said tread connecting the grooves 24 are grooves 26, which are adapted to contain transverse sections of chain 27 attached to the circumferential sections 25. Hooks 28 are also secured to said circumferential sections, said hooks 28 being attached to the wheel body 6′ in substantially the same manner as are the hooks 17 illustrated in Fig. 2. The chains in the last named case serve as means for preventing skidding of the tire as well as to assist in securing the tread portion 12′ thereof to the shoe portion of said modified form of tire, said chains being much more efficient in this connection than are chains now in common use for the reason that they extend circumferentially of the tread and at all points in said circumference.

It will be evident that a tire constructed in accordance with the above will be better adapted to resist puncture, for the reason that the tread of said tire will be comparatively free from tension due to its being detachable.

Having thus described my invention what I claim and desire by Letters Patent to secure is:

1. A tire comprising a shoe constructed of resilient material and provided with a circumferentially disposed dovetail recess, a detachable tread portion provided with an internal circumferential rib adapted to fit said recess, said tread having circumferential and transverse grooves disposed about its periphery, chains arranged in said grooves, and means adapted to retain said chains in said grooves and said tread within said recess.

2. The combination with a wheel body of a shoe constructed of resilient material and mounted on said wheel body, said shoe having a circumferentially disposed groove in its outer periphery, a tread portion constructed of resilient material and arranged in said circumferentially disposed groove, said tread portion having circumferential and transverse grooves formed in its outer periphery, chains arranged in said grooves, and means to yieldingly secure said chains to said wheel body, whereby said tread portion will be held within said groove, said chains also constituting means adapted to prevent skidding of said tire.

In testimony whereof I have hereunto set my hand in presence of two subscribing witnesses.

PETER BERNSTEIN.

Witnesses:
CHARLES S. GOODING,
SYDNEY E. TAFT.